July 24, 1928.  C. K. CHANDLER  1,677,885
TELEGRAPHIC AND TELEPHONIC RECEIVING CIRCUITS
Filed Aug. 15, 1925
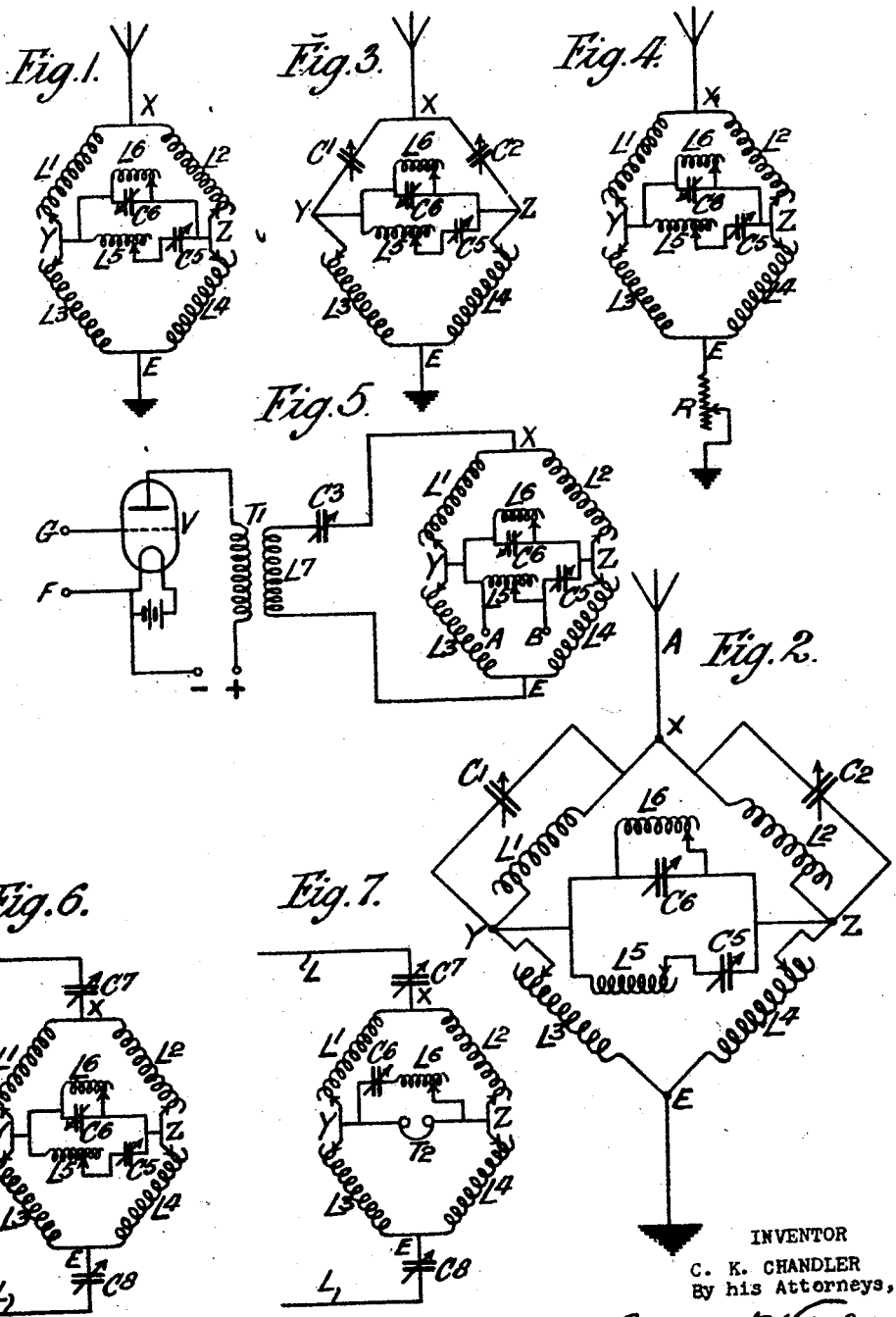
INVENTOR
C. K. CHANDLER
By his Attorneys, Patented July 24, 1928.

1,677,885

UNITED STATES PATENT OFFICE.

CHARLES KINGSLEY CHANDLER, OF THE HEADQUARTERS OF THE ROYAL AIR FORCE, INDIA.

TELEGRAPHIC AND TELEPHONIC RECEIVING CIRCUITS.

Application filed August 15, 1925, Serial No. 50,492, and in Great Britain September 3, 1924.

The invention relates to a method for cutting out the effects of shock excitation of signal receiving circuits such as those used for wireless telegraphy, land line telegraphy and telephone, the shocks being produced by atmospherics, magnetos, keying of near-by transmitting sets, power mains, etc. The device works on the principle that a shock excitation is first generally either of low frequency or has a slow rate of charge. This excitation of the circuits at a slow rate causes these circuits to oscillate at their own natural frequency following the initial impulse just as a pendulum when struck oscillates at its own natural frequency. Thus any device which is to cut out this interference from signal circuits must deal with (a) a current at low frequency or an impulse, (b) a current at the natural frequency of the circuit, (c) must ensure that the natural frequency of the circuit is different from that of the required signal, (d) must provide paths for the undesired currents and (e) must ensure the low frequency currents or impulses do not shock excite the signal circuits proper. The device described below fulfils these requirements as will be shown.

According to this invention an arrangement somewhat similar to a Wheatstone bridge is inserted in the line or aerial, which is connected to opposite corners of the bridge, while the receiving circuit proper forms the diagonal between the other corners of the bridge and is shunted by a closed oscillatory circuit.

The accompanying drawings, Figures 1 to 7, show various forms of the invention.

Referring to Figure 1, the aerial is connected to opposite corners X, E, of the bridge, the arms of which consist of variable inductances $L^1$, $L^2$, $L^3$, and $L^4$. The other diagonal Y, Z, contains the receiving circuit, consisting of an inductance $L^5$ and a capacity $C^5$ in series with it, and this circuit is shunted by an oscillatory circuit comprisng an inductance $L^6$ and a capacity $C^6$.

The slow charging of the aerial by an impulse causes a slowly charging current to flow through the branches XZE, XYE. Due to the slowness of the rate of charge of the current and the comparatively small capacity of the aerial the potential difference across XE is very small and thus a relatively large difference in adjustment between the branches XZE, XYE, will produce comparatively little potential difference across YZ.

Thus we can unbalance the arms of the bridge to give a large difference of potential between Y and Z due to the signal current, which, in the case of wireless telegraphy, has a high frequency and builds up a high potential difference between X and E and hence between Y and Z when the bridge is unbalanced. The impulse then does not shock excite the circuits between Y and Z since it produces too small a voltage across these points, but the signal produces a comparatively high difference of potential.

The aerial circuit, however, oscillates at its own natural frequency due to the impluse which has now passed. This frequency is high and a large potential difference is built up across Y and Z since high frequency currents flow in the two branches and the bridge is unbalanced.

By adjustment of the values of $L^1$, $L^2$, $L^3$, $L^4$, the frequency of the oscillation at the natural frequency of the aerial is made different from that of the required signal, i. e. the aerial circuit must not be tuned to the frequency of the signal to be received but to some other frequency.

Now due to the unbalancing of the arms of the bridge we have a large potential difference between Y and Z for the signal and also for the oscillation at the natural frequency of the aerial circuit.

The circuits $L^5$ $C^5$ and $L^6$ $C^6$ are both tuned to the incoming signal, thus the signal currents pass through $L^5$ $C^5$ and the interfering currents at a different frequency pass through $L^6$ $C^6$ which has a low impedance to the passage of these currents.

$L^5$ $C^5$ offers a large impedance to the paths of currents of different frequency to that of the signal, while $L^6$ $C^6$ offers an almost infinite impedance to currents of signal frequency.

The impedance offered by the circuit $L^6$ $C^6$ depends on the frequency of the currents flowing through it and hence can be adjusted to any required low value for the interfering currents by varying the natural frequency of the aerial circuit which is done by adjusting $L^1$, $L^2$, $L^3$, $L^4$.

$L^6$ is a small inductance, $C^6$ is a large capacity, while $L^5$ is a large inductance and $C^5$ is a small capacity.

The detecting device is connected across $L^5$ so that since there is a large potential difference across $L^5$ due to the signal and a very small one or none due to the interfering currents, there results a signal free from interference.

The greater the amplifying power of the detecting and amplifying circuits, the greater the effect of the device becomes in cutting out the interference, since the aerial circuit can be detuned to a greater extent.

The bridge thus controls the frequency of the interfering current as well as balances the initial impulse or low frequency current.

Figure 2 shows a similar arrangement in which the inductances $L^1$ $L^2$ are shunted by condensers $C^1$ $C^2$.

An alternative circuit is shown in Figure 3, which differs from Figure 1 only in the substitution of variable capacities $C^1$ $C^2$ for the inductances $L^1$ $L^2$.

The action is the same except that now the slow impulse or low frequency interfering currents set up a large potential difference across XE but a small one across YE and ZE, the majority of the potential difference being across $C^1$ $C^2$.

Now $C^1$ $C^2$ can be arranged to have only a small impedance as far as the signals are concerned so that the large signal voltage is built up across $L^3$ and $L^4$ but a small signal voltage only across $C^1$ and $C^2$. Thus if $C^1$ and $C^2$ are kept substantially equal, the potential difference across YZ due to the low frequency current or impulse will be small even if I make $L^3$ and $L^4$ unequal. On the other hand, when $L^3$ and $L^4$ are made unequal I have a large difference produced in the signal potential difference across YZ since the main signal potential difference is across YE and ZE.

The aerial oscillates at its own natural frequency as before following the impulse and $C^1$ $C^2$ $L^3$ $L^4$ are adjusted to give a natural frequency of the aerial different from that of the signal.

A potential difference exists across YZ due to the interfering currents at this high frequency and a potential difference due to the signal currents but very little potential difference due to the initial impulse or low frequency current. Thus signal currents flow through $L^5$ $C^5$ which presents a path of low impedance to these currents whilst the interfering currents flow through $L^6$ $C^6$ which has a high impedance for the signal but low impedance for currents at other freqencies. This action is the same as already described.

To improve the operation of the apparatus a variable resistance R may be placed in the aerial circuit, as shown in Figure 4, which differs from Figure 1 only in this respect. This has the effect of cutting down the oscillating currents at the natural frequency of the aerial circuit, whilst having little effect on the signal currents. This is due to the fact that the aerial resistance alone affects the interfering currents when the aerial is oscillating at its own natural frequency whilst there is a large additional reactance which affects the signal currents since the aerial is not tuned to the signal freqency. Thus additional resistance affects the interference but does not affect the signal if this extra resistance is not too large. Alternatively, variable resistances may be connected in the branches XYE, XZE, for the same purpose. A variable condenser can also be used in series with the aerial for the purpose of adjusting its natural frequency and to regulate the potential across XE due to the impulse.

This device can be used in the intervalve circuits of valve amplifiers to give a second cutting out of interference after a certain amount has been cut out by the device in the aerial circuit.

When this is done it is necessary to use a variable condenser in series with the bridge as shown in Figure 5, in which V is an amplfying valve, F and G are terminals connected to a receiving circuit or to the previous valve transformer, $T^1$ is a transformer and A and B are leads to the next valve. This condenser is shown at $C^3$. It can be adjusted to ensure that a high potential difference is not produced across the circuit XE due to the slow impulse on low frequency currents, thus preventing shock excitation of the signal circuits $L^5$ $C^5$, $L^6$ $C^6$. It also allows control of the natural frequency of the whole circuit ($L^7$, $C^3$, bridge). When low frequency currents are to be received all inductances and capacities are large. For high frequency currents they are small.

When used for reception of wired wireless, condensers $C^7$, $C^8$, are used to couple the bridge with the lines L, L, as shown in Figures 6 and 7. These condensers should be made variable in order to enable adjustment to be made of the natural frequency of the circuits and of the value of the low frequency interference potential difference across the bridge between X and E.

The same remarks apply when the device is used for cutting out shock excitation in telephone circuits, care being taken to see that the natural frequency of the bridge circuits and series condensers is outside the normal voice frequency, otherwise distortion will occur. This is done by adjustment of $C^7$, $C^8$, $L^1$, $L^2$, $L^3$, $L^4$.

Instead of a rejector circuit across the receiver, as in the case of telegraphy, however, an acceptor circuit is used tuned to the natural frequency of the bridge circuit, since here we wish to reject a current of one frequency only and accept all other frequencies.

The acceptor circuit passes the oscillating currents at the natural frequency of the circuit:—Line, $C^7$, $L^2$ $L^4$, and $L^1$ $L^3$ in parallel, $C^8$, line, and prevents them from passing through the telephone.

Thus we have (a) a balance for the low frequency impulse, (b) oscillations at a frequency different from any voice frequency and this oscillating energy passing through $L^6$ $C^6$ in Figure 7 instead of through the telephone $T^2$. Very small voice frequency currents only will pass through $L^6$ $C^6$, the major portion passing through the telephones if $L^6$ $C^6$ and $C^7$ $C^8$ are properly adjusted.

The device acts also to clear forced high frequency oscillations in the aerial circuit away from high frequency oscillations (of a different frequency) which it is desired to receive, as well as to clear shock excitation. Thus if weak signals are being jammed by strong signals on another wave the interference due to the large high frequency currents being induced in the receiving aerial may be cut out. These high frequency currents may be from a neighbouring wave transmission station working on a different wave length from that which it is desired to receive. For the sake of clearness let us take the latter station as having a wave length of 2000 metres while the jamming station is on 2200 metres.

Now if the aerial circuit is arranged to be detuned as already set out so that its natural wave length is 1900 metres say, then the 2000 metres station which it is desired to receive will have a very much greater effect on the aerial than the 2200 metres jamming station. Thus the forced oscillations of the jamming current in the aerial circuit will be cut down much more than the signal currents and these jamming oscillations will pass away via the rejector circuit $L^6$ $C^6$ as before, the arms of the bridge being unbalanced and large potential differences for both signal and interfering currents being built up across YZ.

When the circuits are used in this way the wave length of the signal to be received is placed between the natural wave length of the aerial circuit and that of the jamming signal. Further, by adjusting the arms of the bridge as well as detuning the aerial I adjust the amount of energy which the rejector $L^6$ $C^6$ circuit must deal with and thus aid its action in clearing the signal of interference. The signal currents pass through $L^5$ $C^5$ as already described due to the potential difference between YZ.

What I claim is:—

1. In a signal receiving system having a collector circuit for incoming signals and a detector circuit, means for balancing out oscillations in said circuit caused by static and other disturbances comprising an unbalanced Wheatstone bridge in said collector circuit having variable reactances in each of its arms and adjusted for minimum impedance at a frequency different from the frequency of the incoming signals, said detector circuit being connected across one pair of conjugate arms, and a pair of tuned circuits connected in parallel across the other pair of conjugate arms, one of said tuned circuits being adjusted to offer high impedance at the signal frequency, the other tuned circuit being adjusted to cause the combined circuit to be resonant to the signal frequency.

2. In a signal receiving system having a collector circuit for incoming signals and a detector circuit, means for balancing out oscillations in said circuit caused by static and other disturbances comprising an unbalanced Wheatstone bridge in said collector circuit, reactances in arms of said bridge adjusted for minimum impedance at a frequency different from the frequency of the incoming signals, said detector circuit being connected across one pair of conjugate arms, and a pair of tuned circuits connected in parallel across the other pair of conjugate arms, one of said tuned circuits being adjusted to offer high impedance at the signal frequency, the other tuned circuit being adjusted to cause the combined circuit to be resonant to the signal frequency.

3. In a signal receiving system having a collector circuit for incoming signals and a detector circuit, means for balancing out oscillations in said circuit caused by static and other disturbances comprising an unbalanced Wheatstone bridge in said collector circuit having variable reactances in each of its arms and adjusted for minimum impedance at a frequency different from the frequency of the incoming signals, said detector circuit being connected across one pair of conjugate arms, two of said variable reactances being inductances located on opposite sides of the connections of the detector circuit and the other variable reactances being capacities, and a pair of tuned circuits connected in parallel across the other pair of conjugate arms, one of said tuned circuits being adjusted to offer high impedance at the signal frequency, the other tuned circuit being adjusted to cause the combined circuit to be resonant to the signal frequency.

4. In a signal receiving system having a collector circuit for incoming signals and a detector circuit, means for balancing out oscillations in said circuit caused by static and other disturbances comprising an unbalanced Wheatstone bridge in said collector circuit having reactances in each of its arms and adjusted for minimum impedance at a frequency different from the frequency of the incoming signals, said detector circuit being connected across one pair of conjugate arms, each of said reactances being variable capacities shunted across two of said arms and on opposite sides of connections of the detector circuit, and a pair of tuned circuits connected in parallel across the other pair of conjugate arms, one of said tuned circuits being adjusted to offer high impedance at the signal frequency, the other tuned circuit being adjusted to cause the combined circuit to be resonant to the signal frequency.

In testimony that I claim the foregoing as my invention I have signed my name this twenty-fifth day of June, 1925.

CHARLES KINGSLEY CHANDLER.